March 2, 1937.  J. EGGERT ET AL  2,072,741
APPARATUS FOR PROJECTION OF LENTICULAR FILM
Filed April 10, 1934.
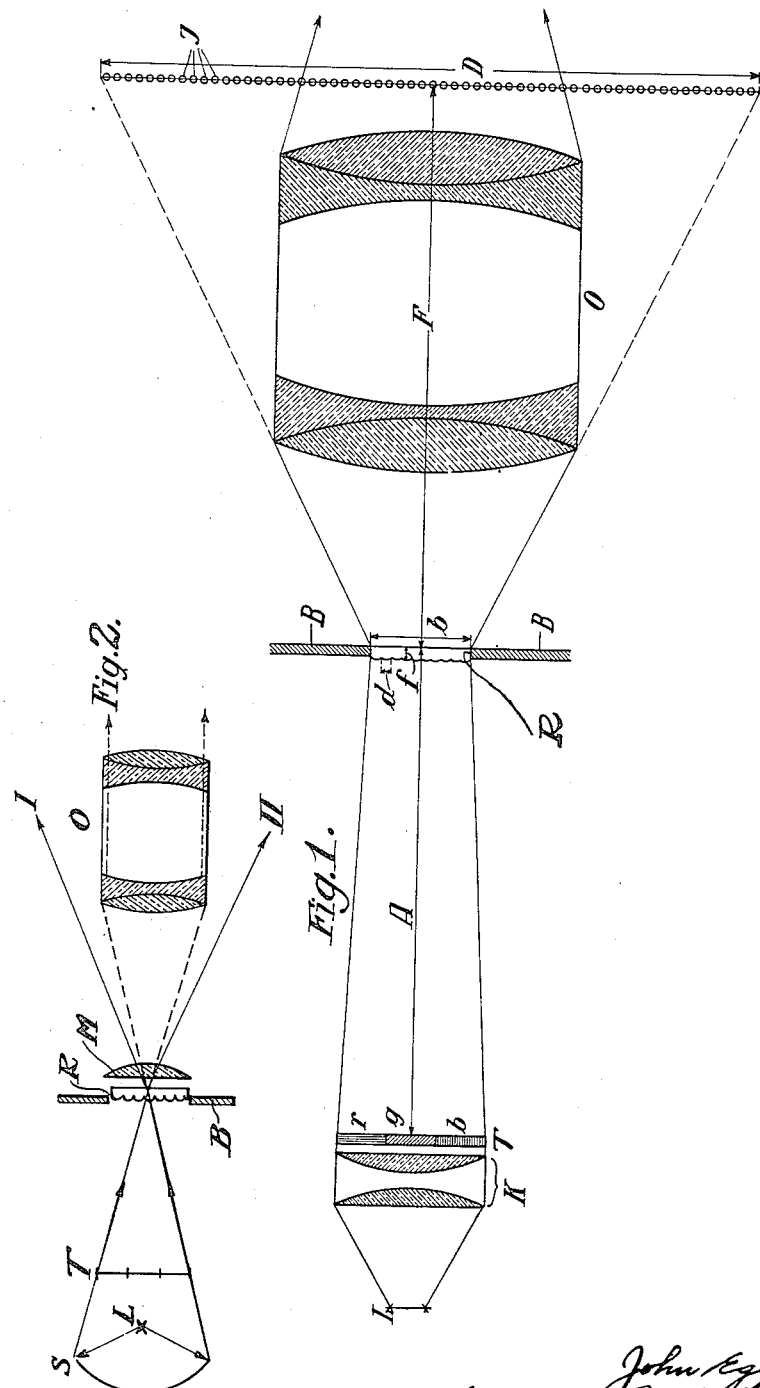
Inventors:
John Eggert,
Gerd Heymer,
by Potter, Pierce & Scheffler,
Attorneys.

Patented Mar. 2, 1937

2,072,741

UNITED STATES PATENT OFFICE 2,072,741

APPARATUS FOR PROJECTION OF LENTICULAR FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application April 10, 1934, Serial No. 719,954
In Germany April 19, 1933

2 Claims. (Cl. 88—16.4)

Our present invention relates to apparatus for projection of lenticular film.

One of its objects is an improved arrangement for the projection of lenticular film. Further objects will be seen from the detailed specification following hereafter. Reference is made to the accompanying drawing in which Fig. 1 shows digrammatically an arrangement for projection of lenticular film according to this invention, and Fig. 2 shows diagrammatically another arrangement for projecting lenticular film according to this invention.

According to this invention a color-true and bright reproduction is obtained with the filter arranged between the source of light and the film, the latter having its embossed side facing the source of light if care be taken that both, the light rays which are directly projected and those, which are laterally scattered and produce interference images are projected on the screen. This is achieved by giving the projection objective suitable dimensions, that is to say its aperture must be so large, that rays which are scattered laterally are also reproduced.

Regarding the lateral dispersion, the phenomena of interference produced by the lenticular elements are of importance, which phenomena are more fully described in "Zeitschrift für technische Physik", vol. 12, 1931, page 578 et seq. In projecting lenticular films these phenomena act in the following manner:

When using the usual projectors, an image of the source of light is projected near the film by a lamp mirror or by a condenser or by both, while by parts of the objective facing the picture gate, there is projected a real image of the lamp mirror or the condenser on the parts of the objective facing the projector screen. By arranging a lenticular film in the picture gate there is produced, in addition to the said image of the source of light and of the lamp mirror or condenser a series of images due to interference, which are arranged perpendicularly to the axes of the lenticular elements on both sides of the image and the number of which depends on the optical properties of the lenticular elements. By masking part of these lateral interference images, dominant colors in the projected image are produced. According to the invention these are eliminated by using a projection objective having an aperture of sufficient dimension, so that all of the lateral interference images assist the reproduction on the projection screen.

This is realized by using an objective of such aperture that the pupil of entrance has a diameter $$D = b + F \cdot \left( \frac{C+b}{A} + \frac{n \cdot d}{f} \right)$$

in which formula:

F is the apparent distance of the pupil of entrance of the projection objective when viewed from the film,
b is the breadth of the picture gate,
A is the distance of the filter from the lenticular elements,
n is the refractive index of the film material,
d is the diameter of the lenticular element,
f is the focal length of a lenticular element, and
C is the apparent breadth of T when viewed from the film.

The formula permits to calculate the diameter of the pupil of entrance of the projection objective for a determined distance of the pupil of entrance from the film, this distance being usually determined by the focal length of the objective.

The invention will be more fully understood from the examination of the accompanying drawing.

Referring to Fig. 1, L represents the source of light, and K is a condenser projecting the source of light L on the lenticular film R. Between the condenser K and the film R at the distance A from the lenticular elements of the film there is arranged the multi-color filter T with the areas r (red), g (green) and b (blue). The lenticular film is arranged with its lenticular elements facing the source of light. The lenticular film R is placed in the picture gate B; the lenticular elements have the diameter d and the focal length f. The pencil of light rays passing through the film is scattered by the film and spread to such an extent that at the distance F from the lenticular film R it has the diameter D. Therefore, the objective O must have such an aperture that its pupil of entrance when viewed from the film has at least the diameter D. By the scattering action of the lenticular film R there are produced interference images J. The arrangement is preferably such that no parts such as masks or lens mounts obstruct the light rays emanating from the border of the picture field.

In Fig. 2 there is shown a modification of the arrangement shown in Fig. 1 in which there is arranged a convergent lens system close to the lenticular film on the side remote of the source of light. There is preferably used a cylindrical lens when the lenticular film has cylindrical lenses because scattering is produced only in the direction perpendicular to the axis of the lenticular embossings.

Referring to Fig. 2, the source of light L is projected on the emulsion layer of the lenticular film R in the picture gate B by means of the mirror S. In the path of the light rays there is placed the multi-color filter T. O is a projection objective of an aperture which would normally not embrace all the light rays of the bundle passing through the lenticular film R. However by inserting close to the picture gate B the convergent lens system M, this latter will converge the pencil I—II of light passing through the film R so that all the light passes through the objective O.

What we claim is:

1. In an apparatus for projecting lenticular film in combination, a source of light, a lenticular film to be projected, said lenticular film being arranged with its lenticular elements facing said source of light, means for projecting said source of light on said film, a multi-color filter arranged between said film and said source of light, and an objective facing the smooth side of said lenticular film, said objective having such an aperture that the pupil of entrance has at least a diameter $$D = b + F \cdot \left( \frac{C+b}{A} + \frac{n \cdot d}{f} \right)$$

F being the apparent distance of the pupil of entrance of the projection objective when viewed from the film,
b being the breadth of the picture gate,
A being the distance of the filter from the lenticular elements,
n being the refractive index of the film material,
C being the apparent breath of the multi-color filter when viewed from the film.

2. In an apparatus for projecting lenticular film in combination, a source of light, a lenticular film to be projected, said lenticular film being arranged with its lenticular elements facing said source of light, means for projecting said source of light on said film, a multi-color filter arranged between said film and said source of light, a convergent lens system in close proximity to said film on the side remote from said source of light, an objective, said lens system and said objective forming an optical system having such an aperture that the pupil of entrance has at least a diameter $$D = b + F \cdot \left( \frac{C+b}{A} + \frac{n \cdot d}{f} \right)$$

F being the apparent distance of the pupil of entrance of the projection objective when viewed from the film,
b being the breadth of the picture gate,
A being the distance of the filter from the lenticular elements,
n being the refractive index of the film material,
d being the diameter of the lenticular element,
f being the focal length of a lenticular element, and
C being the apparent breadth of the multi-color filter when viewed from the film.

JOHN EGGERT.
GERD HEYMER.